Sept. 26, 1961 J. H. REBMAN ET AL 3,001,802
HYDRO-SEAL TEST COUPLING
Filed April 8, 1959
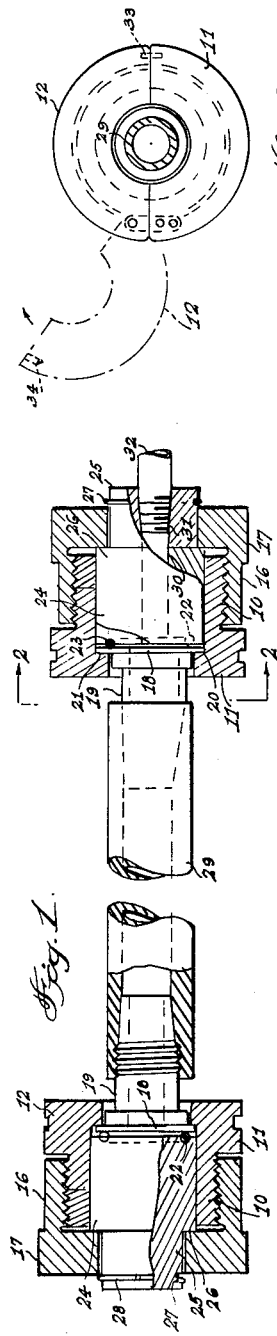
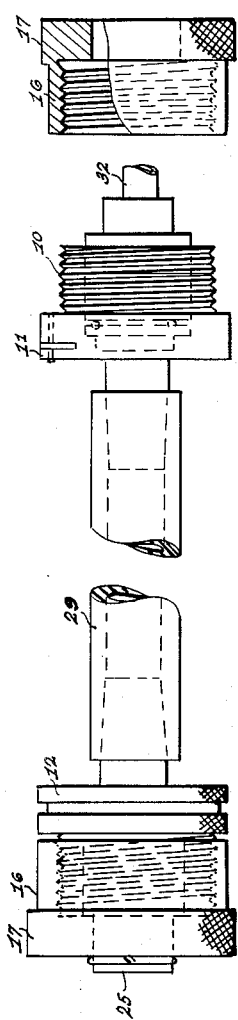
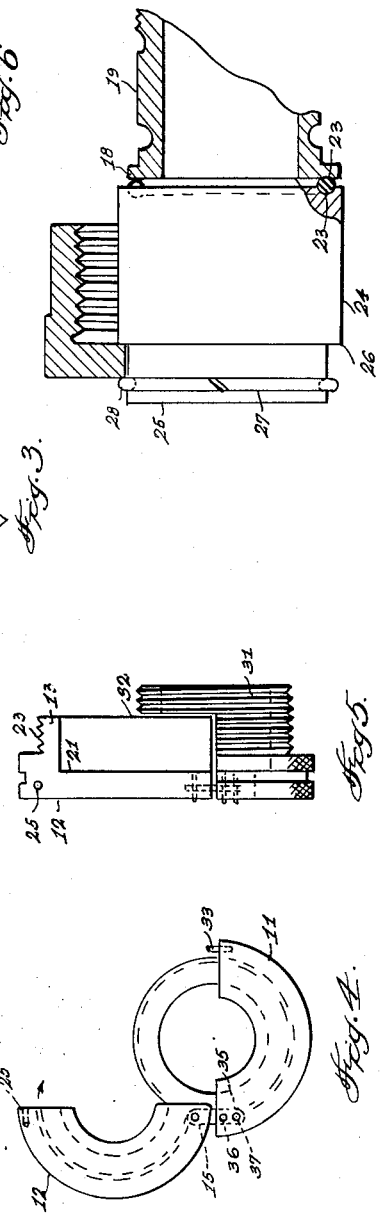
INVENTORS
JOSEPH H. REBMAN &
SIDNEY E. SHENSKY
BY
*Victor J. Evans & Co.*
attorneys

3,001,802
HYDRO-SEAL TEST COUPLING

Joseph H. Rebman, S.C.A.T.S., West Columbia, S.C., and Sidney E. Shensky, 880 NE. 181st St., P.O. Box 607, North Miami Beach, Fla.
Filed Apr. 8, 1959, Ser. No. 804,976
1 Claim. (Cl. 285—35)

This invention relates to fittings particularly of the type used for air hose in combination with aircraft, and in particular couplings secured on the ends of air hose for testing the hose.

The purpose of this invention is to expedite connecting fluid under pressure to air hose whereby the time required for testing air hose is reduced to a minimum.

In the conventional method of testing hose a blank is clamped with bolts on one end of the hose and a similar fitting having a fluid receiving opening therein is clamped on the opposite end and as from four to six bolts are used in the fitting on each end considerable time is required in applying and removing the bolts. With this thought in mind this invention contemplates a coupling in which a section of one side is hinged whereby the coupling may be opened, a flanged end of a hose inserted and the hinged part of the coupling returned whereby a collar may be threaded over the split coupling to positively clamp the coupling on the end of a hose.

The object of this invention is, therefore, to facilitate installing and removing fittings on the ends of a piece of hose to facilitate testing the hose.

Another object of the invention is to provide a split coupling for closing one end of an air hose and for connecting a fluid supply to the opposite end in which the fittings are applied to the ends of the hose in a comparatively few seconds.

Another important object of the invention is to provide a coupling having a hinged section therein to expedite attaching the coupling to the end of a hose in which the coupling may be applied by the average layman.

A further object of the invention is to provide a split coupling for connecting fluid under pressure to an air hose in which the coupling is of a single and economical construction.

With these and other objects and advantages in view the invention embodies an externally threaded sleeve having a split flange on one end with a semi-circular section of the flange pivotally connected by a link to a permanent section thereof and with means for readily securing the split section in the permanent section to facilitate testing a hose.

Other features and advantages of the invention will appear from the following description taken in connection with the drawing, wherein:

FIGURE 1 is a side elevational view of a hose connector with the improved test coupling of this invention positioned on the ends thereof and shown in section.

FIGURE 2 is a cross section through the hose connector taken on line 2—2 of FIGURE 1 with the coupling of this invention shown in elevation and with a split section of the coupling in the open position in broken lines.

FIGURE 3 is a plan view of the hose connector shown in FIGURE 1 with a gate holder or coupling nut separated from the coupling.

FIGURE 4 is an end elevational view of the coupling with the split or hinged section thereof shown in the open position.

FIGURE 5 is a side elevational view of the coupling shown in FIGURE 4 also with the split or hinged section thereof in the open position.

FIGURE 6 is a side elevational view of a closure or plug designed to be inserted in a coupling at one end of a hose for closing the end of the hose.

Referring now to the drawing wherein like reference characters denote corresponding parts the improved hydro-seal test coupling of this invention includes an externally threaded sleeve 10 having a semicircular flange 11 on one end with a complementary section or gate 12 having a semi-circular threaded section 13 extending therefrom pivotally mounted by a pin 14 on a link 15 extended from the flange 11 and mounted to swing to a position nested in the sleeve 10, a gate holder or locking nut 16 having an annular knurled flange 17 on one end threaded on the sleeve 10 and portion 13 of the section 12 for securing the section 12 in the nested position with a flange 18 of a hose connection 19 clamped in the coupling.

The inner end of the sleeve 10, on which the flange 11 is positioned is provided with a semi-circular shoulder 20 against which the flange 18 is held and a similar shoulder 21 is provided in the section 12.

The flange 18 on the end of the hose connection 19 abuts a sealing ring 22 carried in an annular groove 23 in a plug 24 positioned in the coupling and, particularly as shown in FIGURE 6 the plug is provided with a section 25 of reduced diameter which extends from a shoulder 26 and the section 25 is provided with an annular groove 27 in which a split spring ring 28 is positioned for retaining the plug in position in the coupling.

The plug 24 at one end of the hose 29 is solid providing a closure in the coupling and at the end of the hose and the plug at the opposite end is provided with an opening 30 having a threaded section 31 in the outer end for receiving a tube 32 through which fluid, such as oil, is supplied under pressure to the hose being tested.

The sides of the flanges 11, opposite to the sides to which the hinge sections 12 are connected are provided with positioning pins 33 that extend into corresponding sockets or openings 34 in the sections 12.

The links 15 are secured in slots 35 in the ends of the flanges 11 by pins 36 and 37, as illustrated in FIGURE 4.

In use a hose is removed from aircraft, or the like, and with the gate 12 open, as illustrated in FIGURES 2 and 4 the flanges 18 of the hose connectors 19 are inserted in the stationary portions 11 of the flanges and with the parts in position the sections 12 are closed and the gate holders or locking nuts 16 run on the threads thereby locking the hinged sections in position over the plugs and sealing the couplings in position on ends of the hose.

With the ends of the hose sealed in this manner fluid under pressure is supplied through the connection 32 and the hose may be efficiently tested for leaks and the like.

It will be understood that modifications, within the scope of the appended claim, may be made in the design and arrangement of the parts without departing from the spirit of the invention.

What is claimed is:

In a coupling for a pair of pipes, the combination which comprises an externally threaded sleeve having a semi-circular portion integrally extended from one end and the semi-circular portion having the threads continued thereon, an external semi-circular flange on the end opposite to the end on which the externally threaded sleeve is positioned, a semi-circular member having complementary semi-circular flange and a semi-circular externally threaded portion extended therefrom, the semicircular flange and semi-circular portion being positioned to nest against the semi-circular portion of the externally threaded sleeve and semi-circular flange thereof, a link positioned with ends thereof extended into recesses of the flanges, pins extended through the flanges and ends of the links for pivotally connecting the semi-circular flange and sleeve, a positioning pin extended from one end to the semi-circular flange and positioned to extend into an opening in the extended end of the complementary semi-circular flange, and an internally threaded sleeve having a knurled external flange on one end adapted to be threaded on the externally threaded portions, internal flanges on the internally threaded sleeve, the semi-circular portion and the semi-circular member adapted to clampingly engage flanges on the ends of said pipes.

References Cited in the file of this patent

UNITED STATES PATENTS

| | | |
|---|---|---|
| 283,771 | Gerin | Aug. 28, 1883 |
| 904,522 | Firmin | Nov. 24, 1908 |
| 919,913 | Miller | Apr. 27, 1909 |
| 932,805 | McLaughlin | Aug. 31, 1909 |
| 965,704 | Goldberg | July 26, 1910 |
| 1,027,694 | Corbett | May 28, 1912 |
| 1,892,649 | Buenger | Dec. 27, 1932 |
| 2,651,794 | Heitman | Sept. 15, 1953 |

FOREIGN PATENTS

| | | |
|---|---|---|
| 327,558 | France | Dec. 20, 1902 |
| 369,798 | Germany | Apr. 16, 1921 |